(12) United States Patent
Eichel

(10) Patent No.: US 8,524,085 B2
(45) Date of Patent: Sep. 3, 2013

(54) SEWAGE COMPOSTING METHOD

(75) Inventor: Dain Brian Eichel, Damascus, OR (US)

(73) Assignee: City of Newberg, Newberg, OR (US)

( * ) Notice: Subject to any disclaimer, the term of this patent is extended or adjusted under 35 U.S.C. 154(b) by 237 days.

(21) Appl. No.: 12/987,810

(22) Filed: Jan. 10, 2011

(65) Prior Publication Data

US 2012/0174638 A1 Jul. 12, 2012

(51) Int. Cl.
*C02F 3/12* (2006.01)
*C05F 11/08* (2006.01)
*B09B 3/00* (2006.01)

(52) U.S. Cl.
USPC .............. 210/620; 71/9; 210/623; 435/262.5

(58) Field of Classification Search
USPC .............. 71/8–13; 435/262.5; 210/620, 621, 210/623
See application file for complete search history.

(56) References Cited

U.S. PATENT DOCUMENTS

| | | | |
|---|---|---|---|
| 3,725,258 A | 4/1973 | Spector et al. | |
| 4,193,786 A | 3/1980 | Brill | |
| 4,204,959 A * | 5/1980 | Kreuzburg et al. | 210/195.1 |
| 4,236,910 A * | 12/1980 | Norin et al. | 71/9 |
| 4,249,929 A * | 2/1981 | Kneer | 71/9 |
| 4,483,704 A * | 11/1984 | Easter, II | 71/9 |
| 4,494,975 A * | 1/1985 | De Boodt et al. | 71/25 |
| 4,659,472 A | 4/1987 | Nordlund et al. | |
| 4,728,517 A * | 3/1988 | Markham et al. | 426/53 |
| 4,828,577 A | 5/1989 | Markham, Jr. et al. | |
| 5,354,349 A * | 10/1994 | Inoue | 71/9 |
| 5,417,736 A * | 5/1995 | Meyer | 71/9 |
| 5,685,891 A | 11/1997 | Peltola | |
| 6,174,472 B1 * | 1/2001 | Johnson et al. | 264/118 |
| 6,245,121 B1 * | 6/2001 | Lamy et al. | 71/1 |
| 6,337,203 B1 * | 1/2002 | Beaulieu | 435/262.5 |
| 6,423,532 B1 * | 7/2002 | Rindelaub | 435/262.5 |
| 6,447,568 B1 | 9/2002 | Shiiba et al. | |
| 6,852,142 B2 | 2/2005 | Varshovi | |
| 7,211,429 B1 * | 5/2007 | Rudas | 435/262 |
| 7,497,890 B2 * | 3/2009 | Sahl | 71/14 |
| 7,806,957 B1 * | 10/2010 | Burke | 71/10 |
| 8,449,773 B2 * | 5/2013 | Hansen et al. | 210/627 |
| 2005/0199028 A1 * | 9/2005 | Shin | 71/8 |
| 2009/0139289 A1 * | 6/2009 | Le | 71/10 |

OTHER PUBLICATIONS

Patent Cooperation Treaty, Notification of Transmittal of the International Search Report and the Written Opinion of the International Searching Authority, or the Declaration dated Aug. 17, 2012.
"Recent Advancements in Wastewater Sludge Composting" by Israil Turovskiy and Jeffrey Westbrook, Florida Water and Resources Journal, Apr. 2003, 42-44.
"Aerobic composting of waste activated sludge: Kinetic analysis for microbiological reaction and oxygen consumption" by Y. Yamada and Y. Kawase, Waste Management 26 (2006) 49-61.

* cited by examiner

*Primary Examiner* — Wayne Langel
(74) *Attorney, Agent, or Firm* — Chernoff, Vilhauer, McClung & Stenzel, LLP

(57) ABSTRACT

A method for creating Class A compost for sale to the public from waste products, especially municipal sewage, involving lower expense and improved versatility over prior methods.

14 Claims, 1 Drawing Sheet

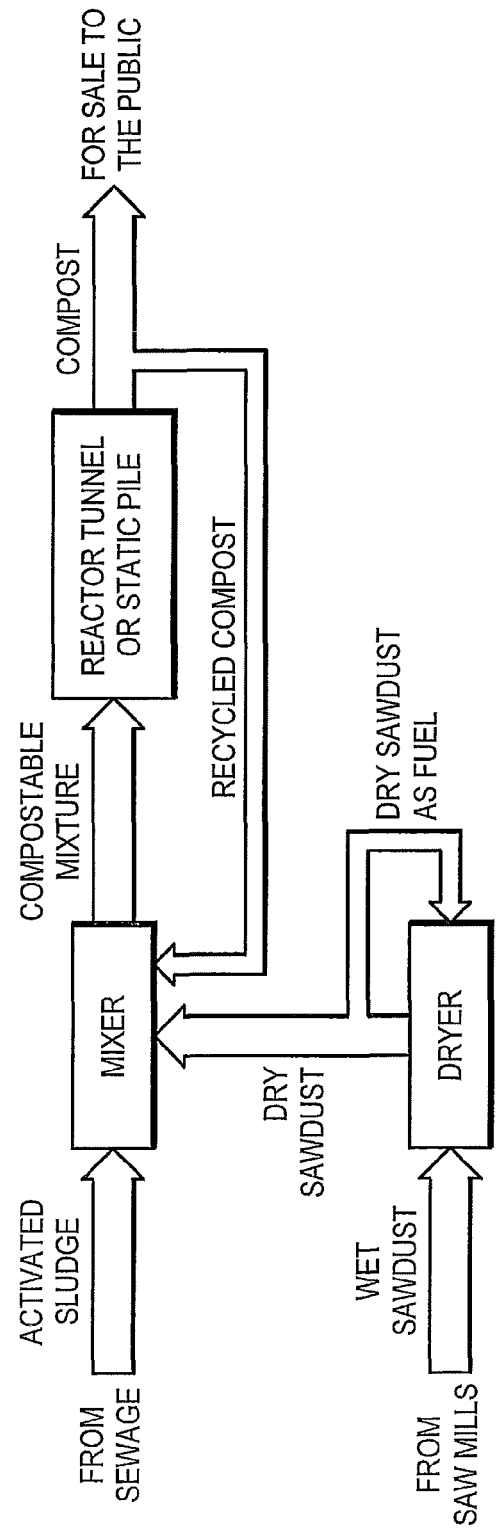

SEWAGE COMPOSTING METHOD

BACKGROUND OF THE INVENTION

Municipalities worldwide must contend with the safe disposal of sewage generated by households and businesses. Although sewage is mostly water, substantial quantities of organic solids and pathogenic bacteria, which thrive on such solids, are present. Treatment typically begins with aeration of the wastewater to begin breaking down these solids. The now activated sludge can be removed from the wastewater by clarifiers, the use of which are well known in the art, but it still contains pathogens and must be somehow rendered safe for disposal. Simply dumping waste can lead to the contamination of waterways, but burying it in a landfill is expensive and uses up limited landfill space. Environmental regulations also limit disposal methods and increase their potential cost.

One solution to the safe disposal of these organic wastes is the creation of compost. Proper composting in accordance with 40 C.F.R. §503.32(a)(7)(ii) and Appx. B(A)(4) kills pathogens through natural heating caused by the activity of aerobic bacteria. This process is, of course, less energy-intensive than generating sterilizing heat by burning fuel, and it is also superior environmentally to chemical means. The resultant end product, known as "Class A" compost, is no longer a threat to health, and in fact can be sold to the public for use as a natural fertilizer under 40 C.F. R. §503.15. This outcome is highly desirable because it turns sewage from a waste product requiring careful disposal into a commodity in demand.

Composting itself has been practiced for millennia, and probably predates recorded history. However, successful composting of sewage on an industrial scale has proven much more difficult than anticipated. Attempts have been made to adapt reactor tunnels designed for solid wastes to the more watery solids typical of sewage, with some disastrous results. The tunnels were designed to permit wastes to be inserted at one end and pushed forward by means of hydraulic rams. The tunnels are large enough that each day's waste consumes only a small fraction of tunnel space, permitting the waste to remain in the tunnel for a total of 30 days or more. As new waste was added at one end and forced forward, compost fell out of the other end. Fans or blowers were provided to force air through the pile to prevent the development of anaerobic bacteria.

This system was reasonably successful for solid organic wastes such as those collected from residential trash containers. When applied to sewage, however, the reactor tunnels faced two problems. First, aeration of the composting pile by means of fans or blowers proved difficult. The pile was essentially a non-porous mass which air could not penetrate. This tended to encourage the pile to become anaerobic, as aerobic bacterial were starved of the oxygen they needed to live. An anaerobic pile has an offensive odor that is impossible to eliminate. Second, the composting sewage ceased to move as a pile when pushed by the rams, and instead began to act more like a liquid, exerting hydraulic pressure on the floor, walls, and roof of the tunnel. This resulted in structural failures as tunnels literally burst like over-pressurized concrete balloons.

Previous efforts at the composting of sewage required fairly extensive dewatering of products by technical means. For instance, the article "Aerobic composting of waste activated sludge: Kinetic analysis for microbiological reaction and oxygen consumption" by Y. Yamada and Y. Kawase, Waste Management 26 (2006) 49-61, calls for sludge of 25% solid content, while "Recent advancements in Wastewater Sludge Composting" by Israil Turovskiy and Jeffrey Westbrook, Florida Water and Resources Journal, April 2003, 42-44, calls for 20% solid content, as well as the use of quicklime to increase sludge temperature. These comparatively dry inputs require additional steps such as centrifuges to remove water, which involve high capital costs and extra maintenance for plant operators. U.S. Pat. No. 4,659,472 calls for dewatering of a sludge/sawdust mixture, involving the addition of a polyelectrolyte to facilitate water removal by pressing.

BRIEF SUMMARY OF THE INVENTION

In contrast to the prior art discussed above, the inventor herein has found that the addition of relatively dry sawdust to dewatered sludge accomplishes three essential purposes. First, it provides food and a good reaction surface on which aerobic bacteria may grow and produce the heat essential to the creation of Class A compost. Second, it increases the porosity of the composting pile such that aeration is much more easily achieved. In fact, it was found that the porosity increased so much that only a fraction of available fan or blower power is used to maintain bacterial growth in reactor tunnels. This method can also be used on "static piles," both aerated and unaerated. Finally, the use of dried sawdust enables greater biosolids loading in the compost mixture, and thereby reduces the time required to process a given volume of waste and increases the maximum throughput of a treatment plant.

This method can operate with relatively wet activated sludge, with solid content below 20%. In fact, sludge with a solid content as low as about 6% can be composted by this method. Such levels can be easily achieved in a continuous fashion by pressing sludge taken from primary clarifiers in a belt filter. No centrifuges or other dewatering steps need be added, nor are special chemicals required. Sawdust of the appropriate size is easily obtained from sawmills and it can be dried on site to the appropriate level using commercially available equipment.

The method also works for relatively dry sludge where it is available, including sludge up to about 32% solid content.

The foregoing and other objectives, features, and advantages of the invention will be more readily understood upon consideration of the following detailed description of the invention, taken in conjunction with the accompanying drawings.

BRIEF DESCRIPTION OF THE DRAWING

The FIGURE is a schematic representation of the method of the invention.

DETAILED DESCRIPTION OF PREFERRED EMBODIMENT

Under EPA rules, composted sewage sludge which is to be offered to the public for use on lawns and gardens should be raised to 40 degrees Celsius or higher and remain at 40 degrees Celsius or higher for five days, and for four hours during the five days, the temperature in the compost pile should exceed 55 degrees Celsius. Some states and localities may impose more stringent standards. This process is intended to kill pathogens found in human and animal waste, and is in addition to various other requirements. One efficient way to achieve this heating, which has the additional benefit of breaking down organic wastes to make them more efficient as fertilizer, is to encourage the growth of aerobic bacteria in a compost pile. A properly operated pile will not require external sources of heat to kill pathogens. As discussed above, however, achieving good conditions for aerobic bacteria in wet sludge has proven difficult. The following method, however, regularly meets EPA requirements and produces a large volume of useful compost.

Wastewater from a sewer system is brought to a treatment plant by conventional means. It may be stored for some time in tanks or ponds before treatment begins. First, it passes through an aeration pond, where oxygen is added to the water to encourage the growth of aerobic bacteria. This is the "activation" step which creates activated sludge. Then, solids are allowed to settle to the bottom of clarifiers, while relatively clean water spills over the top. This waste water may be taken for further treatment in accordance with local environmental rules and best practices. The activated sludge removed from the bottom of the clarifiers is fed into a conventional belt filter, well known in the art. Two strips of fabric forming opposing conveyer belts compress the sludge, squeezing water out. The water passes through the fabric and is taken for treatment. The remaining sludge is still very wet—as much as 85% water.

It is not practical to compost wet sludge alone because it is nearly impossible for enough air to penetrate it to sustain the aerobic bacteria responsible for both the breakdown of organic material and the destruction of pathogens. It is well known in the art to mix in a bulking agent for several reasons: to dry the sludge, to alter the carbon/nitrogen ratio, and to increase porosity. Lignocellulosic particles, including for instance sawdust, paper, and cardboard, may be used. Sawdust is a common bulking agent due to its easy availability and low cost. In wet climates such as western Oregon, softwood sawdust commonly comes from the mill with as much as 60% water. Such high water content does relatively little to improve porosity, and its use has resulted in compost failing to meet EPA guidelines, excessive odor, and even in structural failures in composting reactor tunnels. U.S. Pat. No. 4,659,472 solves this difficulty by chemical means, and by dewatering after the addition of sawdust. However, additional chemicals result in additional expense and additional effort in considering the effect of added chemicals on environmental compliance.

The inventor herein has discovered that the problems associated with wet sludge and wet sawdust can be cured by drying the sawdust to a low moisture content before mixing with the sludge. In so doing, applicant has eliminated the need for extra drying steps for the sludge (such as centrifuges), additional chemicals, or post-mixing drying. Sawdust is easily dried using well-known means, and a fraction of the dried product can even be burned to provide heat for the drying process, resulting in a very cost-effective system overall.

Sawdust is purchased from local sawmills. "Chain cut" sawdust, having an average particle size of about ⅛" square, which corresponds to an average volume of about 32 cubic millimeters, is preferred. Both finer and coarser sawdust or wood chips can be used, but are less than optimal. Finer sawdust does not tend to give a sufficient degree of porosity to promote air circulation, and coarser chips do not absorb water as efficiently or have as large a reaction surface for bacteria as is ideal. There will be substantial variation in chip sizes even within a given lot, and it may be convenient to use a screen to ensure that only the smaller chips are mixed with the sludge. It is possible to grind oversize chips to smaller sawdust to avoid waste.

The wet sawdust is fed into a commercial dryer assembly. The Onix Corporation of Montpelier, Ohio, manufactures suitable industrial dryers in varying sizes. These dryers are well known in the art, and are used for drying various products. In a preferred embodiment, the dryer comprises a large rotating drum to which cylindrical baffles are affixed so that sawdust within the drum makes multiple passes through it, although single pass dryers are also available where the hourly moisture removal rate need not be maximized. Air pressure propels the sawdust through all phases of the drying operation. In a preferred embodiment, some portion of the dried sawdust is burned to provide heat to the dryer, although other heat sources may also be used. No particular dryer need be used, and indeed no particular drying method need be used. However, industrial-scale rotary dryers are convenient when large quantities of sawdust are involved. The sawdust is dried to 15% or less moisture content before mixing with the sludge. In a preferred embodiment, sawdust is dried to about 8% moisture content.

Once the sawdust is dry, it is combined with both sludge and recycled composted material before being composted. The sawdust and sludge may be mixed using well known methods. For instance, the McLanahan Corporation of Hollidaysburg Pennsylvania supplies suitable mixers such as their "Blend Master." In a preferred embodiment, composting takes place in a reactor tunnel, which is well known in large-scale composting operations. PWT Worldwide Waste Solutions Process Systems builds suitable reactor tunnels. The tunnel is a long concrete tube. At one end, waste material ready for composting (comprising raw sludge, sawdust, and recycled compost) is inserted and pushed into place by means of hydraulic rams. A fan or blower system forces air up through the pile from the floor. The inventor herein has found that a 120 horsepower blower system operating at 4 psi was insufficient to aerate sludge which was mixed with wet sawdust, but that only about 50-70 horsepower at 1 psi or less is used when composting by the method described herein. As waste is added and pushed forward, the pile moves gradually towards the discharge end. An elongate temperature probe monitors the temperature of the pile along its length, so that compliance with EPA regulations may be assured. The discharge end is simply open to the air. As waste material is added at the other end and pushed forward, compost falls out of the discharge end of the tunnel, where it may be collected in whatever manner is convenient. For instance, it may simply be picked up off the ground with earth moving equipment. Alternatively, a conveyer belt or similar automatic mechanism may transport it.

Combining recycled compost with sludge and sawdust serves two purposes. First, it serves to inoculate the pile with aerobic bacteria which are essential to the composting process. A relatively small amount of compost can serve this purpose—as little as 5% by dry weight. Second, it serves as a bulking agent like the sawdust, to promote porosity and lower the moisture content of the sludge. Additionally, if the input volume of new sludge is relatively low for some reason, it helps the mixing stage to occur successfully (commercial mixers sometimes require a minimum input to function properly) and helps fill the reactor tunnel to a level that gives optimal operation. The exact amount can be adjusted to suit the goals of the plant operator. For instance, a plant with a low volume of input sludge can minimize costs by recycling a very large volume of compost—any amount, even including 100%, of the input to the compost piles may be recycled, although of course some amount of raw sludge will usually be included. High recycling rates minimize the amount of sawdust the plant must purchase. On the other hand, a plant with a large volume of sludge may need to keep the recycled percentage low, as low as about 5%, in order to successfully process all of its inputs. This will call for a large volume of sawdust. This process also maximizes the compost output. Since compost can be sold to the public for use on lawns and gardens, some plants may find this outcome desirable.

This ability to control the output of a compost pile is useful for plants which see seasonal variation in sewage inputs, for instance, in tourist locations with large transient populations. This is only achieved with the low-moisture sawdust of the invention, which enables a plant operator to have a high degree of control over the characteristics of the inputs.

A third possible reason for recycling compost is if the pile failed to satisfy the time and temperature rules promulgated by the EPA. In this case, all compost failing to meet the guidelines should be recycled, or else disposed of by methods appropriate for non-Class A sewage products.

It is possible to dry recycle compost using the same equipment and methods used to dry sawdust. This can reduce the need to purchase sawdust as a bulking agent and increases the biosolids loading of the compost pile.

In all cases, the pile functions most effectively with a total moisture content of 55% to 65%. The proportions of ingredients should be regulated to keep within this range. In a preferred embodiment, the pile comprises about 65-75% dry weight recycled compost (which is 50-60% moisture), 18-20% dry weight sawdust (which is about 8% moisture), and 7-10% dry weight activated sludge (which is about 86% moisture). When dried sawdust is not used, the inventor herein found that only 2-4% dry weight sludge could be processed successfully, reducing the efficiency and throughput of the composting operation.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for composting sewage, comprising the steps of:
   (a) mixing activated dewatered sewage sludge having less than 15% solid content by weight with lignocellulosic particles, the lignocellulosic particles having less than 20% moisture content by weight, to create a compostable mixture;
   (b) aerating the mixture; and
   (c) composting the mixture to produce a compost.

2. The method of claim 1 wherein the dewatered sludge has from about 6% to about 14% solid content by weight.

3. The method of claim 1 wherein said compostable mixture is substantially free of dewatering chemicals.

4. The method of claim 1 wherein the lignocellulosic particles are wood particles.

5. The method of claim 4 wherein the wood particles have less than 15% moisture content by weight.

6. The method of claim 4 wherein the wood particles have about 8% moisture content by weight.

7. The method of claim 4 further comprising the step of drying the wood particles prior to said mixing.

8. The method of claim 7 wherein said drying is accomplished by the application of heat.

9. The method of claim 4 wherein said wood particles have an average particle volume of about 32 cubic millimeters.

10. The method of claim 1 further comprising the step of adding a recycled portion of the compost to the compostable mixture.

11. The method of claim 10 wherein said recycled portion of the compost has more than 44% solids content by weight.

12. The method of claim 10 wherein said recycled portion of the compost comprises between about 65% and 75% of the total dry weight of the compostable mixture.

13. The method of claim 1 wherein said aerating is accomplished by forcing air through the mixture.

14. The method of claim 1 wherein said sludge and lignocellulosic particles respectively are in a ratio between about 1 to 1.5 and 1 to 2.5 by dry weight.

* * * * *